H. WINDAHL.
SANITARY CHICKEN ROOST.
APPLICATION FILED APR. 27, 1920.
1,349,031.
Patented Aug. 10, 1920.
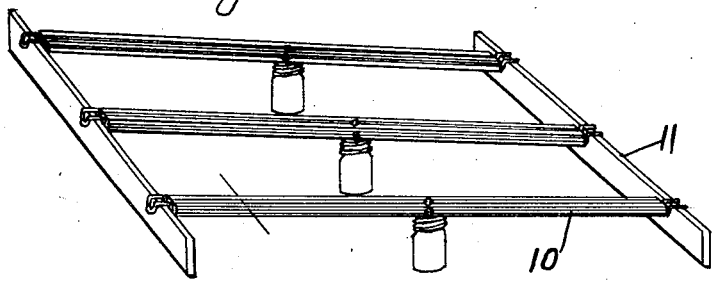
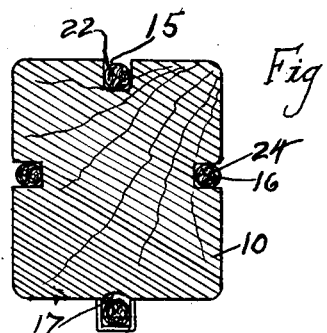
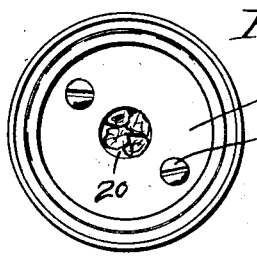
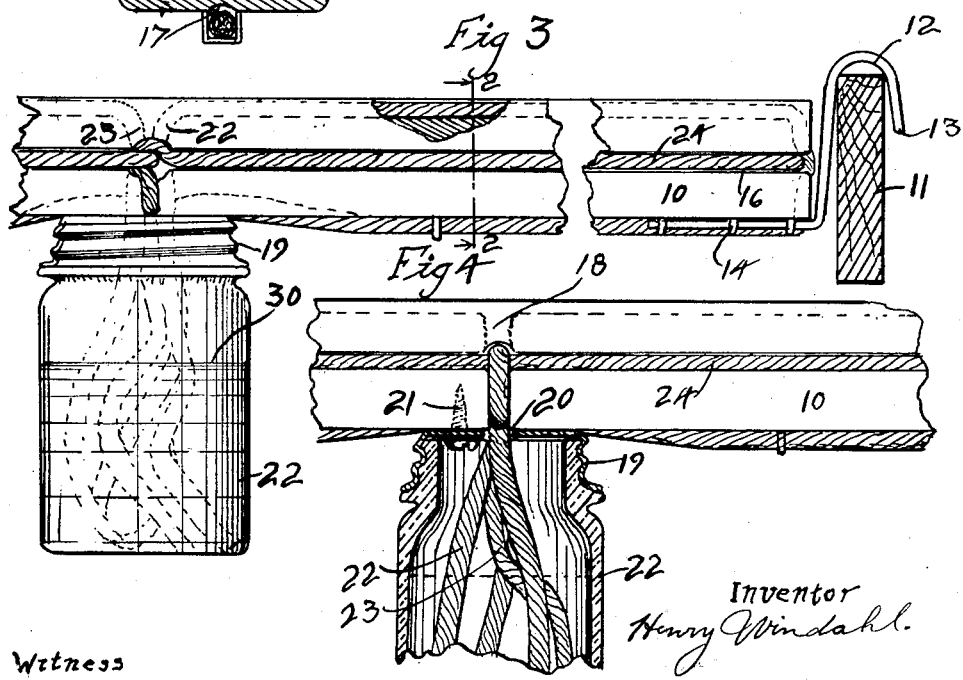
Witness
N. Patterson
Inventor
Henry Windahl.
By Orwig + Bair Attorneys

UNITED STATES PATENT OFFICE.

HENRY WINDAHL, OF NEW SHARON, IOWA.

SANITARY CHICKEN-ROOST.

1,349,031.  Specification of Letters Patent.  Patented Aug. 10, 1920.

Application filed April 27, 1920. Serial No. 377,084.

*To all whom it may concern:*

Be it known that I, HENRY WINDAHL, a citizen of the United States, and a resident of New Sharon, in the county of Mahaska and State of Iowa, have invented a certain new and useful Sanitary Chicken-Roost, of which the following is a specification.

The object of my invention is to provide a chicken roost of extremely simple, durable and inexpensive construction.

More particularly it is my object to provide such a roost so constructed and arranged as to scientifically insure the protection of the fowls resting thereon, from mites and lice and the like, and which will destroy such mites and lice which may be on the fowls, where especially if such mites and lice crawl from the fowls on to the roost.

With these and other objects in view my invention consists in the construction, arrangement and combination of the various parts of the device, whereby the objects contemplated are attained, as hereinafter more fully set forth, pointed out in my claims and illustrated in the accompanying drawings, in which:

Figure 1 shows a perspective view of a chicken roost embodying my invention.

Fig. 2 shows a detail, sectional view taken on the line 2—2 of Fig. 1, illustrating the construction of one of the bars of my roost taken on the line 2—2 of Fig. 3.

Fig. 3 shows a side elevation of one of said bars, parts being broken away, the connecting end bar being shown in section.

Fig. 4 shows a somewhat similar view the container for the germicide being shown in vertical section.

Fig. 5 shows an inverted plan view of the cover for the container.

My improved chicken roost comprises one or more cross bars indicated in the accompanying drawings by the reference character 10 which may be supported at their ends in various suitable ways.

I preferably make my improved chicken roost in sections in which a plurality of cross bars 10 are detachably and adjustably supported on spaced end bars 11. The cross bars 10 may be substantially of the form shown in the drawings, and comprised of bars substantially rectangular in cross section.

I preferably use supporting members comprising somewhat resilient wire folded over on itself to form a downwardly opening hook 12, the members of which are connected at the ends 13 and at their opposite ends are extended along the rod 10, underneath the same and secured thereto in some suitable way, as for instance, by short staples 14.

The hook members 12 can then be placed over the end member 11 as shown in Figs. 1 and 3, and may be adjusted longitudinally of the end members 11 as may be desired.

It will be noted that the hook members are preferably originally so made that they tend to yieldingly grip and frictionally engage the upper edge of the end member 11, so as to be held by such grip against accidental sliding movement on said end member.

Each cross bar 10 is preferably provided in its upper surface with a groove 15 extending longitudinally from end to end of the cross bar. Connected with the groove 15 at each end of the bar is a vertical groove extending down the ends of the bar to the bottom thereof.

Each bar 10 may be provided on each side with a horizontal, longitudinal groove 16. The under surface of the bar may be provided with a groove 17 registering at its ends with the grooves in the ends of the bar.

The groove 17 is preferably considerably deeper near the middle of the bar 10, in order that the cover member for the container, which will be hereinafter described, may rest snugly against the under surface of the bar 10.

A hole 18 indicated by dotted lines in Fig. 4, extends from the groove 15 to the groove 17 at about the middle of the bar 10 from end to end.

Secured to the under surface of the bar 10 at about the middle thereof from end to end is a container cover 19 which may be the top of an ordinary Mason fruit jar. The container cover 19 is provided with a hole 20 which registers with the hole 18. The container cover 19 may be detachably fastened to the bar 10 by means of screws 21. A container 22 may be fastened to the cover 19. The cover 19 may be an ordinary fruit jar cover. Where the form of container and cover illustrated in the drawings are used, the container is provided with a screw-threaded neck and the cover is provided with a screw-threaded flange by which the container and cover may be detachably fastened together, and in this manner the container may be supported below the cross bar 10.

Wicks 23 may be extended from the interior of the container 22 upwardly through the hole 18, thence through the opposite ends of the bar 10 in the groove 15, thence downwardly around the ends of the bar through the groove therein, and thence toward the container in the groove 17 until they contact with the portions of the wick projecting into the container, or they may be extended into the container again. A wick 24 may be extended horizontally around the bar 10 received in the groove 16, and in suitable grooves horizontally in the end of the bar. The wick 24 is extended on each side of the bar 10 downwardly from the groove 15 to the bottom of the bar, and thence toward the center of the bar underneath the same to points where they contact with the wicks 23 and 22, or from thence downwardly into the container 22. The wicks may be secured to the bar 10 in any suitable desired way.

In the practical use of my improved chicken roost, the containers 22 are filled or partly filled with the germicide or disinfectant 30. This disinfectant will travel upwardly and along various lines of wicks until all of the wicks have been more or less saturated therewith.

It will be noted that the top groove 15 is deep enough so that the fowls which stand on the cross bars 10 will have little or no contact with the wicks. This is desirable for I have found that where the wick is laid on top of the roost or projected too much above the roost, too much disinfectant will get on the feet of the chickens and will be harmful. As it is the fumes of the disinfectant will travel upwardly from the roost cross bars 10 when the fowls are roosting thereon at night, and will make the mites and lice restless and cause them to travel.

It is well-known among chicken raisers that mites and lice are active at night. The mites and lice being disturbed by the fumes of the disinfectant will move about and attempt to get off the fowls, the only way they can get off is by traveling downwardly on to the roost bars 10. They will tend to crawl to the bottom of the roost bar where the fumes of the disinfectant are weakened. In the day time the mites and lice are usually inactive. They will try to find a somewhat concealed place to hide and remain until dark. I have found that they tend to collect on the under side of the roost bars, and will try to hide on anything which is found on the underside of the bars. I have, therefore, provided the lower stretch of the wick under the bars which is in a shallow groove or no groove at all, and I find that the mites tend to crawl between the lower stretch of the wick and the bar 10 and are killed in large numbers by the disinfectant.

It is highly desirable that the medicated wick should extend along the under side of the roost bar, in order to take advantage of the fact that the mites and lice tend to collect there.

The bar may be used with or without the side wicks 24. Especial attention is called to the container cover fastened to the under side of the roost bar 10, and to the container detachably connected therewith.

Attention is also called to the great simplicity and cheapness of my improved chicken roost.

Some changes may be made in the construction and arrangement of the various parts of my device without departing from the real spirit and purpose of my invention, and it is my intention to cover by my claims any modified forms of structure or use of mechanical equivalents which may be reasonably included within their scope.

I claim as my invention:

1. A chicken roost having a cross bar, provided with a wick extended longitudinally along the top of said bar, downwardly around the ends of the bar, and along the bottom of the bar, a germicide container connected with said wick below said bar.

2. A chicken roost having a cross bar, provided with a wick extended longitudinally along the top of said bar, downwardly around the ends of the bar, and along the bottom of the bar, a germicide container connected with said wick below said bar, said bar having grooves to receive said wick.

3. A chicken roost having a cross bar, provided with a wick extended longitudinally along the top of said bar, downwardly around the ends of the bar, and along the bottom of the bar, a germicide container connected with said wick below said bar, said bar having grooves to receive said wick, the groove in the top of the bar being of a depth substantially at least to the thickness of the wick.

4. A chicken roost having a cross bar, provided with a wick extended longitudinally along the top of said bar, downwardly around the ends of the bar, and along the bottom of the bar, a germicide container connected with said wick below said bar, said bar having grooves to receive said wick, said bar having a vertical hole extending through it, said wick being extended through said hole and projected into said container.

5. A chicken roost having a cross bar, provided with a wick extended longitudinally along the top of said bar, downwardly around the ends of the bar, and along the bottom of the bar, a germicide container connected with said wick below said bar, said bar having grooves to receive said wick, a cover fixed to said bar and detachably connected to said container.

Des Moines, Iowa, April 13, 1920.

HENRY WINDAHL.